J. WISE & P. LANE.
Washing-Machine.
No. 164,502.  Patented June 15, 1875.
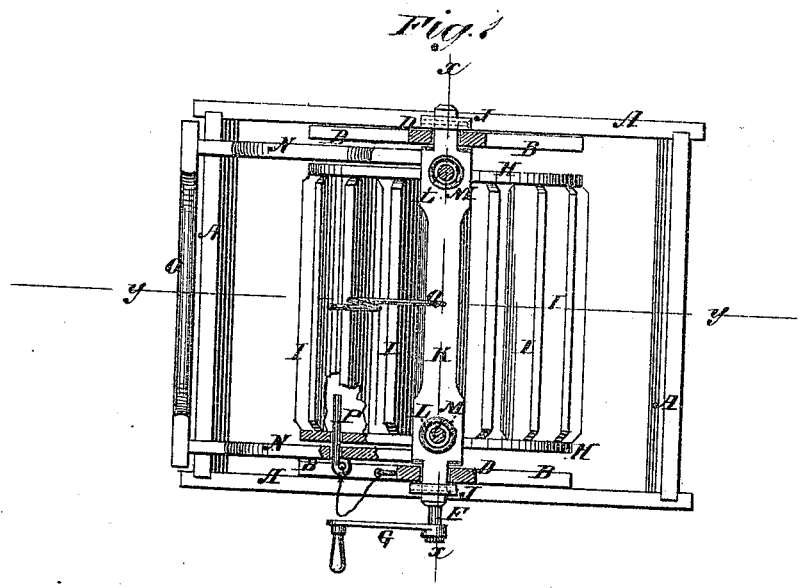
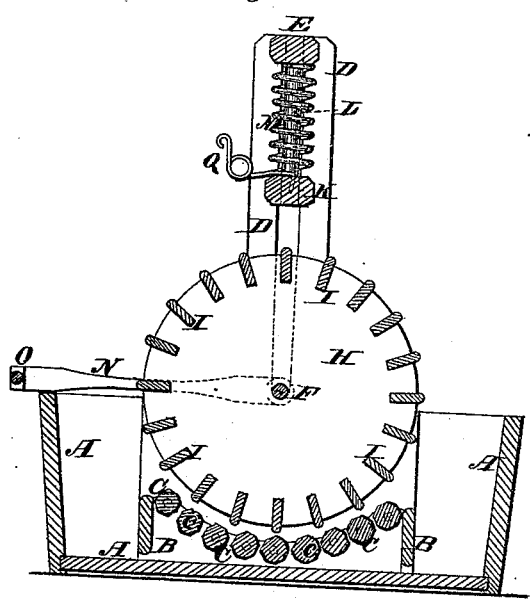
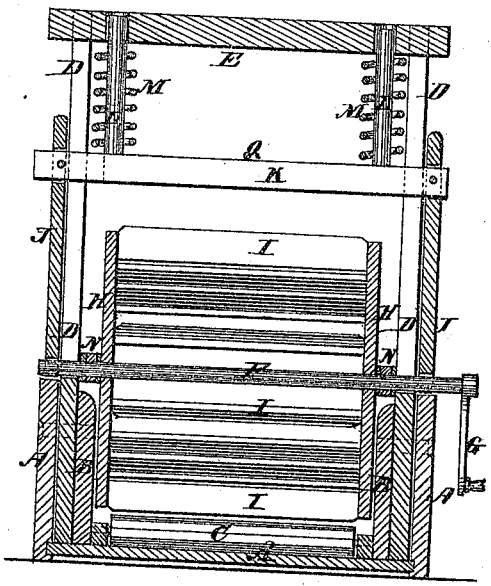
WITNESSES:
Francis McArdle
A. F. Terry
INVENTOR:
Jesse Wise and
Peter Lane
BY
ATTORNEYS.
THE GRAPHIC CO. PHOTO-LITH. 39 & 41 PARK PLACE, N.Y.

UNITED STATES PATENT OFFICE

JESSE WISE AND PETER LANE, OF ELWOOD, INDIANA.

IMPROVEMENT IN WASHING-MACHINES.

Specification forming part of Letters Patent No. 164,502, dated June 15, 1875; application filed November 14, 1874.

*To all whom it may concern:*

Be it known that we, JESSE WISE and PETER LANE, of Elwood, Madison county, Indiana, have invented a new and useful Improvement in Washing-Machines, of which the following is a specification:

Figure 1 is a top view of our improved machine, parts being broken away to show the construction. Fig. 2 is a vertical section of the same, taken through the line $x\,x$, Fig. 1, and Fig. 3 is a vertical section of the same, taken through the line $y\,y$, Fig. 1.

Similar letters of reference indicate corresponding parts.

Our invention has for its object to furnish an improved washing-machine, simple in construction, convenient in use, and effective in operation.

The invention consists in the combination and arrangement of parts, hereinafter described and claimed.

A represents the suds-box of the machine, which is made rectangular in form with vertical sides and slightly inclined ends, as shown in Figs. 1, 2, and 3. B is a box or frame, which is made of such a width as to fit between the sides of the suds-box A, to which it is firmly secured. The frame B is made shorter than the suds-box A, to leave space at the ends of the said frame B, to receive the clothes. To the side bars of the frame B, are pivoted the ends of a number of rollers, C, which we prefer to make polygonal in form, and which are arranged in the arc of a circle so as to be equally distant from the surface of the rubbing-cylinder. D are uprights attached to the suds-box, and connected at the top by a cross-bar, E. F is a shaft, to which are attached two disks, H, which may be made of wood or cast metal, and which are connected at their circumferences by bars I. The bars I are arranged radially, and their outer edges are rounded off so that they will not cut the clothes. J are bars, the lower ends of which bear upon the shaft F, and the upper ends of which are connected by a cross-bar, K. L L are vertical pins attached to said cross-bar, and entering openings in the cross-bar E. M are springs encircling the pins L for exerting the requisite pressure upon the rubbing-cylinder.

To the shaft F, between the uprights D and the disks H, are pivoted the inner ends of the bars N, the outer ends of which are connected by a cross-bar, O, and which are connected with the cylinder H I, when desired, by a pin, P, passed through a hole in the bar N, and through a hole in the disk H. Several holes are formed in the disk H to receive the pin P, so that the bars N O may be readily connected with the cylinder H, whatever may be the position of said cylinder.

The device N O P enables the rubbing-cylinder to be oscillated to rub any part of the clothes that requires extra rubbing from such a position that the operator can hold the clothes with one hand while working the cylinder with the other hand.

When not required for use, the bars N O are held out of the way by catching the bar O upon the catch Q, attached to the cross-bar K.

Having thus described our invention, we claim as new, and desire to secure by Letters Patent—

The combination of the swinging lever or supplementary handle frame N O, with the crank-actuated rubbing-cylinder, adapted to be locked to and unlocked from said frame, as and for the purpose specified.

JESSE WISE.
PETER LANE.

Witnesses:
RUDOLPH BRAUN,
EDGAR H. GUARD.